United States Patent

Musto et al.

[11] Patent Number: 5,275,571
[45] Date of Patent: Jan. 4, 1994

[54] PORTABLE FIRE TRAINER

[75] Inventors: Dominick J. Musto, Middlesex; William Rogers, Hopatcong; Thomas J. Lynch, Jr., Iselin, all of N.J.

[73] Assignee: Symtron Systems, Inc., Fair Lawn, N.J.

[21] Appl. No.: 867,961

[22] Filed: Apr. 10, 1992

[51] Int. Cl.$^5$ .................................................. G09B 9/00
[52] U.S. Cl. ................................. 434/226; 434/219
[58] Field of Search ......................... 434/226, 219

[56] References Cited

U.S. PATENT DOCUMENTS

| | | | |
|---|---|---|---|
| 3,675,342 | 7/1972 | Wolff | 434/226 |
| 4,299,579 | 11/1981 | Swiatosz et al. | 434/226 |
| 4,526,548 | 7/1985 | Livingston | 434/226 |
| 4,983,124 | 1/1991 | Ernst et al. | 434/226 |

Primary Examiner—Gene Mancene
Assistant Examiner—L. Thomas
Attorney, Agent, or Firm—Richard T. Laughlin

[57] ABSTRACT

A portable fire trainer for use in training by an instructor of a company employee in the use of a fire extinguisher for extinguishing a Class A trash can paper fire or a Class B spilled combustible liquid fire or a Class C electrical panel fire. The trainer includes a housing subassembly, and includes an equipment subassembly which has a burnable simulated multifire array of items and which has a flame generating and distributing system.

3 Claims, 2 Drawing Sheets

PORTABLE FIRE TRAINER

The invention generally relates to a portable fire trainer, and in particular the invention relates to a portable fire trainer having a one-piece housing subassembly and a one-piece equipment subassembly.

BACKGROUND OF THE INVENTION

The prior art fire fighting trainer is described in U.S. patent application Ser. No. 817,435, filed Jan. 6, 1992, which is assigned to the same assignee as in this application.

The prior art fire fighting trainer usually include one or more building subassemblies and one or more training compartments each having one or more simulated burnable items.

One problem with the prior art trainer is that it has a relatively high manufacturing cost. Another problem is that the trainer is not portable for use in training at a modest scale within the place of employment.

SUMMARY OF THE INVENTION

According to the present invention, a readily portable fire fighter trainer is provided. This trainer includes a unitary one-piece housing subassembly and a unitary one-piece equipment subassembly which is supported by the one-piece housing subassembly.

By using the one-piece housing subassembly, the cost of manufacture of the trainer is minimized. By using the one-piece equipment subassembly, which is supported by the one-piece housing subassembly, the trainer is made portable.

OBJECTS OF THE INVENTION

One object of the present invention is to provide a fire fighting trainer wherein the cost of manufacture thereof is minimized.

Another object of the present invention is to provide a portable fire trainer for training employees in the use of a fire extinguisher on various types of fires, such as a Class A trash can paper fire, or a Class B liquid fuel fire, or a Class C electrical fire.

The foregoing and other objects, features and advantages will be apparent from the following description of the preferred embodiment of the invention as illustrated in the accompanying drawings.

DESCRIPTION OF THE PREFERRED EMBODIMENT

As shown in FIGS. 1 through 4, a trainer or assembly 10 is provided for use in training employees at a place of work in the use of a fire extinguisher in various types of fires. Trainer 10 has a housing subassembly 12, and an equipment subassembly 14.

Figure 1:
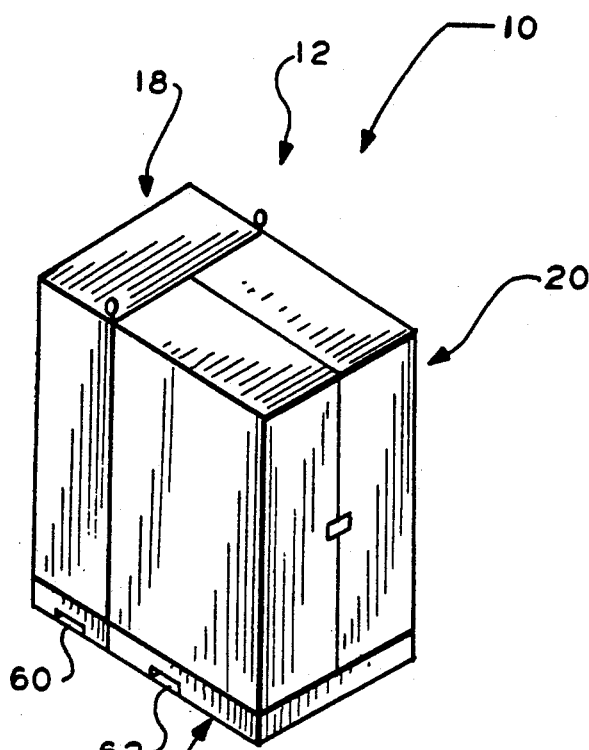
FIG. 1 is a perspective view of a portable fire trainer according to the present invention.
Figure 2:
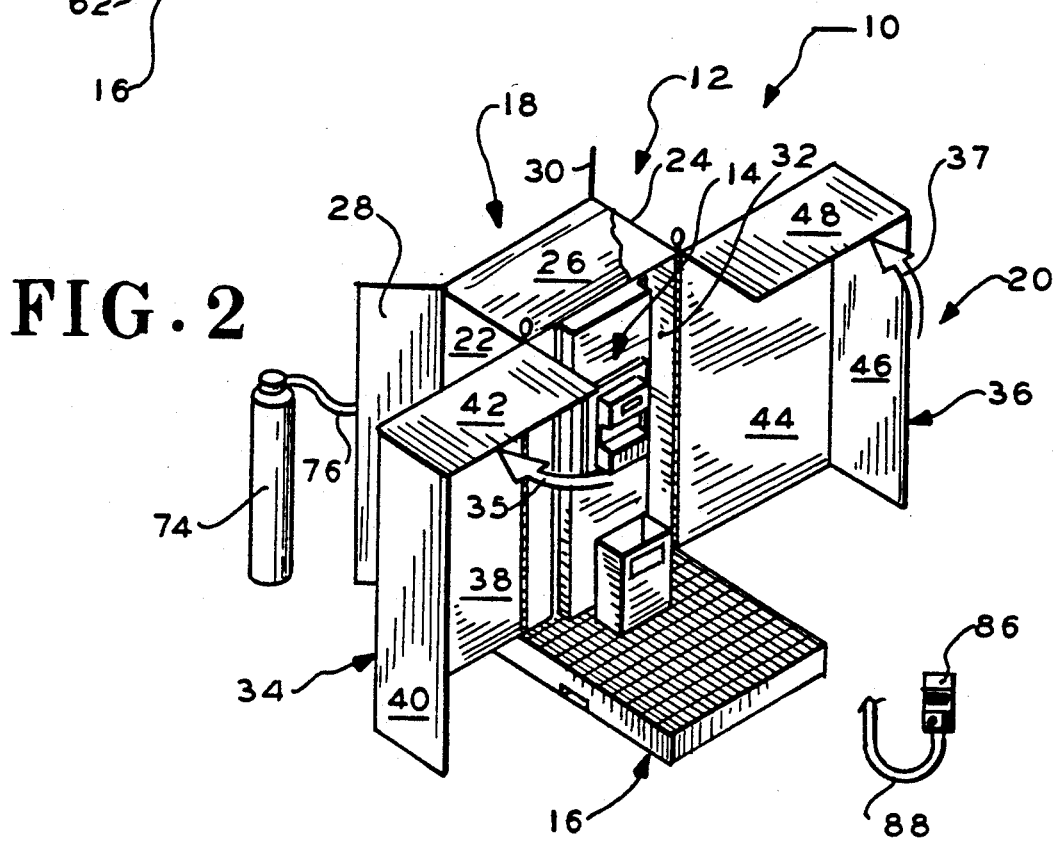
FIG. 2 is a perspective view of the portable fire trainer of FIG. 1 with its doors in an open position.

As shown in FIGS. 1 and 2, housing subassembly 12 which is made of welded steel sheet or plate, or the like, has a housing base 16, and a rear housing or equipment enclosure 18 and a front openable housing 20.

Rear housing 18 has a left side wall 22, which is attached to base 16. Rear housing 18 also has a right side wall 24 which is attached to base 16, and has a top wall 26 which is attached to side walls 22,24. Rear housing 18 also has a left rear door 28 which is hinged to left side wall 22, and has a right rear door 30 which is hinged to right side wall 24, and has a transverse or partition wall 32 which is attached to base 16.

Front housing 20 has a left front wall unit 34 which opens in a direction 35, and has a right front wall unit 36 which opens in a direction 37. Wall unit 34 has a side wall 38 which is hinged to partition wall 32, and has a front wall 40 which is attached to side wall 38, and has a top wall 42 which is attached to side wall 38. Wall unit 36 also has a side wall 44, and has a front wall 46, and has a top wall 48.

Base 16 (FIG. 3) has a base plate 50 which may be welded to partition wall 32 as desired. Partition wall 32 may have pipe openings (not shown) and non-burnable seal rings, as desired, for piping passing mere through. Base 16 also has a four-sided edge plate 52, and has a grating 54 which covers or encloses a cavity 55.

Base 16 (FIG. 2) may be welded, along adjacent edges, to rear side walls 22,24, which are also welded to partition wall 32, that has two lifting eyebolts 56,58. Base 16 also has two near fork lift truck bar guides 60,62 (FIG. 1), and has two far guides (not shown).

Figure 3:
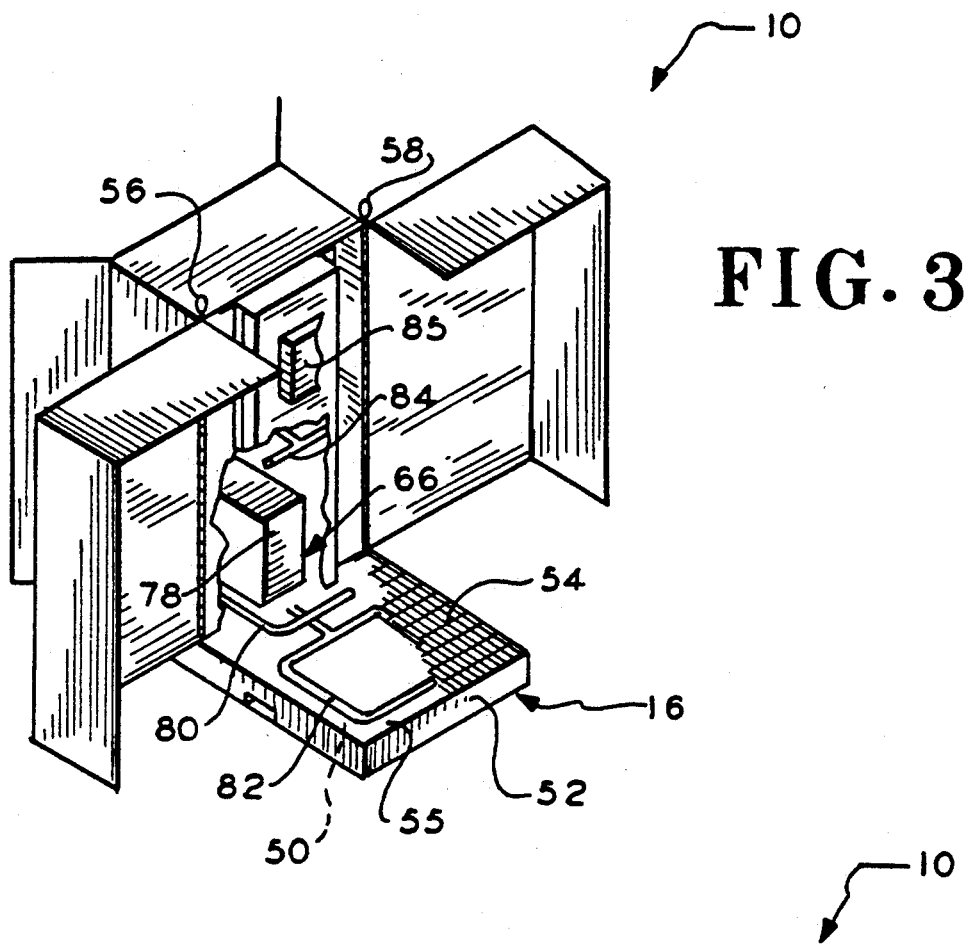
FIG. 3 is a partly cutaway perspective view of the portable fire trainer of FIG. 1.
Figure 4:
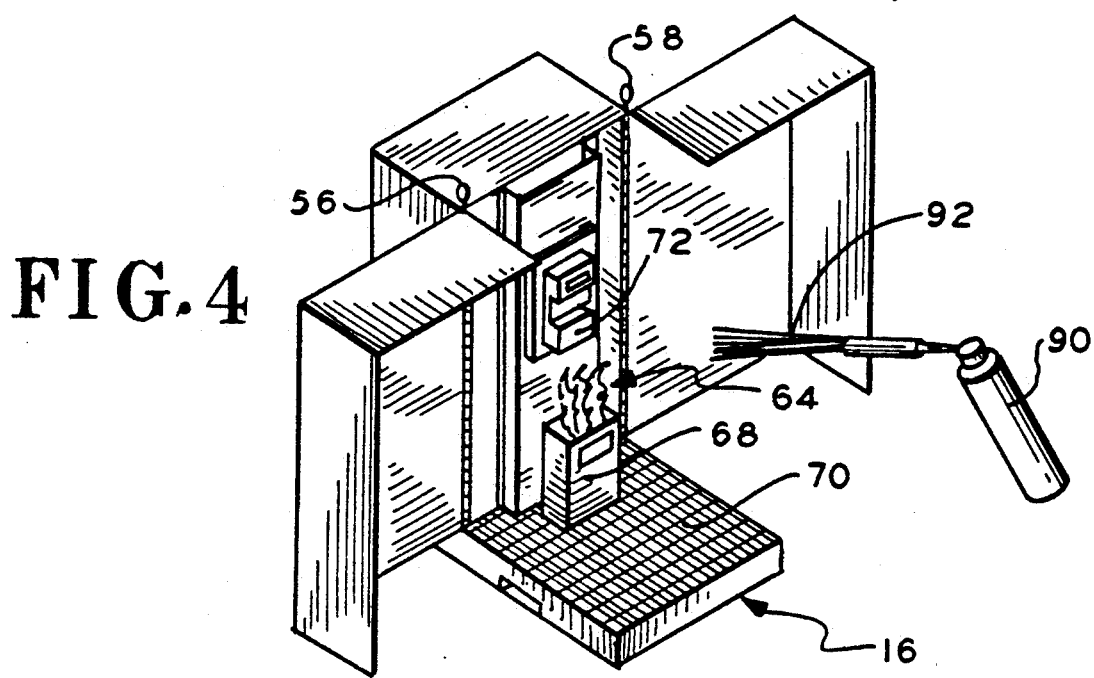
FIG. 4 is a perspective view of the portable fire trainer of FIG. 1 in an operating condition.

As shown in FIGS. 2, 3 and 4, equipment subassembly 14 has a burner multifire simulated assembly 64 (FIG. 4), and has a flame generating and distributing system 66 (FIG. 3).

Multifire assembly has a simulated trash can 68 in a Class A fire such as a fire of dry combustible material, and has a simulated open area 70 for a Class B fire such as a spilled combustible liquid fire, and has a simulated electrical panel 72 for a Class C fire such as an electrical fire.

Flame generating system 66 (FIG. 3) has a fuel tank 74 which has a main pipe or mainfold 76, and has a burner control device 78. Flame generating system 66 also has a trash can outlet pipe or element 80, and has an open area outlet pipe or element 82, and has an electrical panel outlet pipe or element 84. Manifold 76 connects at one end to tank 74 and connects at another end to burner control device 78. Each of the outlet pipes 80,82,84 connects at one end to burner control device 78 and opens at its other end.

Burner control 78 has a hand controller 86, and has a connecting cable 88. Cable 88 connects to electrical control 85 at one end and connects to hand controller 86 at its other end. Burner control 78 has ignitors (not shown), and has regulators (not shown), and has valves (not shown), for producing and regulating a flame at the three simulated fire devices or sites 68,70,72.

In operation, a trainee or user (not shown) holds a fire extinguisher 90 (FIG. 4) which produces a flame extinguishing agent 92. An instructor (not shown) holds the hand controller 86 for setting the location and extent of flames during a training session of the trainee.

The advantages of trainer 10 are indicated hereafter.

A) Trainer 10 has a cost of manufacture which is substantially less than that of the prior art trainer.

B) Trainer 10 is a portable trainer for ease of shipment.

C) Trainer 10 is used for training company employees in the use of a fire extinguisher for extinguishing a Class A fire such as a trash can paper fire, and for extinguishing a Class B fire such as a combustible liquid fire, and for extinguishing a Class C fire such as an electrical panel fire.

While the invention has been described in its preferred embodiment, it is to be understood that the words which have been used ar words of description rather than limitation and that changes may be made within the purview of the appended claims without departing from the true scope and spirit of the invention in it broader aspects.

Instead of a hand controller 86 and cable 88, a remote radio control device, or an infrared signal control device can be used.

Instead of using three simulated fire devices 68, 70, 72, which show three classes of fire, a spreading fire assembly, such as first and second and third devices which are arranged to show a spreading fire, can be used.

The embodiments of an invention in which an exclusive property or right is claimed are defined as follows. What is claimed is:

1. In a fire trainer for use in training a trainee in the use of a hand held fire extinguisher by an instructor in the extinguishing of various classes of fires, comprising a gas fire and a simulated burn structure, the improvement which comprises: providing a readily portable fire demonstrating unit consisting of a portable unit containing a unitary housing subassembly and a unitary equipment subassembly which is supported by the housing subassembly; said equipment subassembly having a burnable simulated multifire assembly having a plurality of devices of different class fires; said equipment subassembly having a flame generating and distributing system having a plurality of outlet pipes respectively disposed adjacent to the plurality of devices of different class fires and a hand controller connected to a cable for operating by the instructor to control the amount of flame; wherein the housing subassembly includes:

a housing base;
a rear housing attached to the housing base;
a front housing attached to the rear housing;
said rear housing having a left side wall and a right side wall and a top wall inclosing a compartment; and wherein the housing subassembly includes:
a pair of rear doors and a partition wall for enclosing the compartment at its rear and at its front; and wherein the front housing includes:
a left front wall unit having a side wall hinged to the partition wall;
a right front wall unit having a side wall hinged to the partition wall; and
each left and right front wall unit having a front wall and a top wall attached to its side wall.

2. In a fire trainer for use in training a trainee in the use of a hand held fire extinguisher by an instructor in the extinguishing of various classes of fires, comprising a gas fire and a simulated burn structure, the improvement which comprises: providing a readily portable fire demonstrating unit consisting of a portable unit containing a unitary housing subassembly and a unitary equipment subassembly which is supported by the housing subassembly; said equipment subassembly having a burnable simulated multifire assembly having a plurality of devices of different class fires; said equipment subassembly having a flame generating and distributing system having a plurality of outlet pipes respectively disposed adjacent to the plurality of devices of different class fires and a hand controller connected to a cable for operating by the instructor to control the amount of flame;

wherein the housing subassembly is a unitary subassembly formed into one unit;
the equipment subassembly is a unitary subassembly form into one unit; and
the trainer has a lifting means, whereby the trainer can readily be moved; and
wherein the burnable simulated multifire assembly includes:
a simulated trash can for a Class A fire;
a simulated open area for a Class B fire;
a simulated electrical panel for a Class C fire; and
wherein the housing base includes:
a base plate attached to the rear housing side walls;
a four-sided edge plate attached to the base plate; and
a grating attached to the four-sided edge plate.

3. The trainer of claim 2 wherein the flame generating and distributing system includes:
a fuel tank for holding the fuel;
a supply pipe connecting to the fuel tank for conducting the fuel;
a burner control device connecting to the supply pipe;
an electrical control device connected to the burner control device for controling the flame;
a trash can outlet pipe; an open area outlet pipe; and an electrical panel outlet pipe.

* * * * *